United States Patent [19]

Luo et al.

[11] Patent Number: 6,038,146
[45] Date of Patent: Mar. 14, 2000

[54] HIGH POWER FACTORS, SINGLE STAGE HARMONICS CORRECTION CONVERTER

[75] Inventors: Edward Han Chen Luo, San Jose, Calif.; Piotr Markowski, Warsaw, Poland; Fu-Sheng Tsai, Northboro, Mass.

[73] Assignee: Computer Products, Incorporated, Fremont, Calif.

[21] Appl. No.: 08/874,412

[22] Filed: Jun. 13, 1997

[51] Int. Cl.[7] .......................... H02M 3/335; H02M 3/24; H02M 5/42; H02M 7/217
[52] U.S. Cl. .............................. 363/21; 363/80; 363/89; 363/127
[58] Field of Search .................. 363/20, 21, 78, 363/80, 89, 127

[56] References Cited

U.S. PATENT DOCUMENTS

| | | | |
|---|---|---|---|
| 4,412,277 | 10/1983 | Mitchell | 363/81 |
| 4,437,146 | 3/1984 | Carpenter | 363/21 |
| 4,677,366 | 6/1987 | Wilkinson et al. | 323/222 |
| 4,853,837 | 8/1989 | Gulczynski | 363/80 |
| 4,940,929 | 7/1990 | Williams | 323/222 |
| 4,974,141 | 11/1990 | Serverinsky et al. | 363/81 |
| 5,066,900 | 11/1991 | Bassett | 323/224 |
| 5,067,066 | 11/1991 | Chida | 363/16 |
| 5,088,019 | 2/1992 | Williams et al. | 363/69 |
| 5,097,196 | 3/1992 | Schoneman | 323/222 |
| 5,126,931 | 6/1992 | Jitaru | 363/21 |
| 5,134,355 | 7/1992 | Hastings | 323/211 |
| 5,173,846 | 12/1992 | Smith | 363/20 |
| 5,180,964 | 1/1993 | Ewing | 323/222 |
| 5,206,800 | 4/1993 | Smith | 363/21 |
| 5,224,025 | 6/1993 | Divan et al. | 363/16 |
| 5,227,941 | 7/1993 | Rubin | 361/18 |
| 5,231,563 | 7/1993 | Jitaru | 363/98 |
| 5,262,930 | 11/1993 | Hua et al. | 363/21 |
| 5,264,780 | 11/1993 | Bruer et al. | 323/222 |
| 5,331,534 | 7/1994 | Suzuki et al. | 363/21 |
| 5,343,378 | 8/1994 | Tohya | 363/21 |
| 5,442,539 | 8/1995 | Cuk et al. | 363/89 |
| 5,446,366 | 8/1995 | Bassett et al. | 323/222 |
| 5,448,465 | 9/1995 | Yoshida et al. | 363/15 |
| 5,515,257 | 5/1996 | Ishii | 363/21 |
| 5,600,546 | 2/1997 | Ho et al. | 363/21 |

OTHER PUBLICATIONS

M. M. Jovanovic', et al., Reduction of Voltage Stress in Integrated High–Quality Rectifier–Regulators by Variable––Frequency Control, "Switching Rectifiers for Power Factor Correction", vol. V of the VPEC Publication Series, pp. 145–151, (1994).

Richard Redl and Laszlo Balogh, 1995 IEEE, "Design Consideration for Single–Stage Isolated Power–Factor–Corrected Power Supplies with Fast Regulation of the Output Voltage," pp. 454–458 (1995).

Odd Roar Schmidt, 1994 IEEE, "Quasi Resonant AC/DC Forward Converter With Sinusoidal Input Current," pp. 339–344 (1994).

TDK, Application Note, "*Current Control High Voltage Source*," 2 pages (1996).

International Electrotechnical Commission 1000–3–2, "*Electromagnetic Compatibility*", odd pp. 1–27, (1995).

G. Hua et al., "*Novel Zero–Current–Transition PWM Converters*", Virginia Polytechnic Institute and State University, Blacksburg, VA 24061, 6 pgs.

L. Yang et al., "Analysis and Design of Boost Zero–Voltage–Transition PWM Converter", IEEE 0–7803–0982–0/93, pp. 707–713, (1993).

Ionel Dan Jitaru, "Soft Transitions Power Factor Correction Circuit", HFPC, Proceedings, pp. 202–208, May (1993).

L. Huber et al., "Single–State, Single–Switch, Isolated Power Supply Technique with Input–Current Shaping and East Output–Voltage Regulation for Universal Input–Voltage–Range Applications", 1997 IEEE, pp. 272–280.

*Primary Examiner*—Peter S. Wong
*Assistant Examiner*—Bao Q. Vu
*Attorney, Agent, or Firm*—Skjerven, Morrill, MacPherson, Franklin & Friel LLP; Michael J. Halbert

[57] ABSTRACT

An AC-to-DC power converter (power supply) with high power factors and which minimizes the input charging current flowing through the separate inductor by locating the separate inductor between a full-bridge rectifier and the transformer but out of the storage capacitor's current path.

In this manner, when the input voltage is sufficiently high, the converter draws input current into the transformer through the separate inductor, while current flowing to and charging the storage capacitor is unimpeded by the separate inductor. The current being drawn through the separate inductor and into the transformer may also be used to recharge the storage capacitor. Associated losses are reduced and the separate inductor may be reduced in size. Other embodiments eliminate the second primary winding in the transformer and place a second set of windings coupled to the separate inductor between the full-bridge rectifier and the storage capacitor, which reduces the current spike when the storage capacitor is recharged with current flowing through this path.

14 Claims, 8 Drawing Sheets

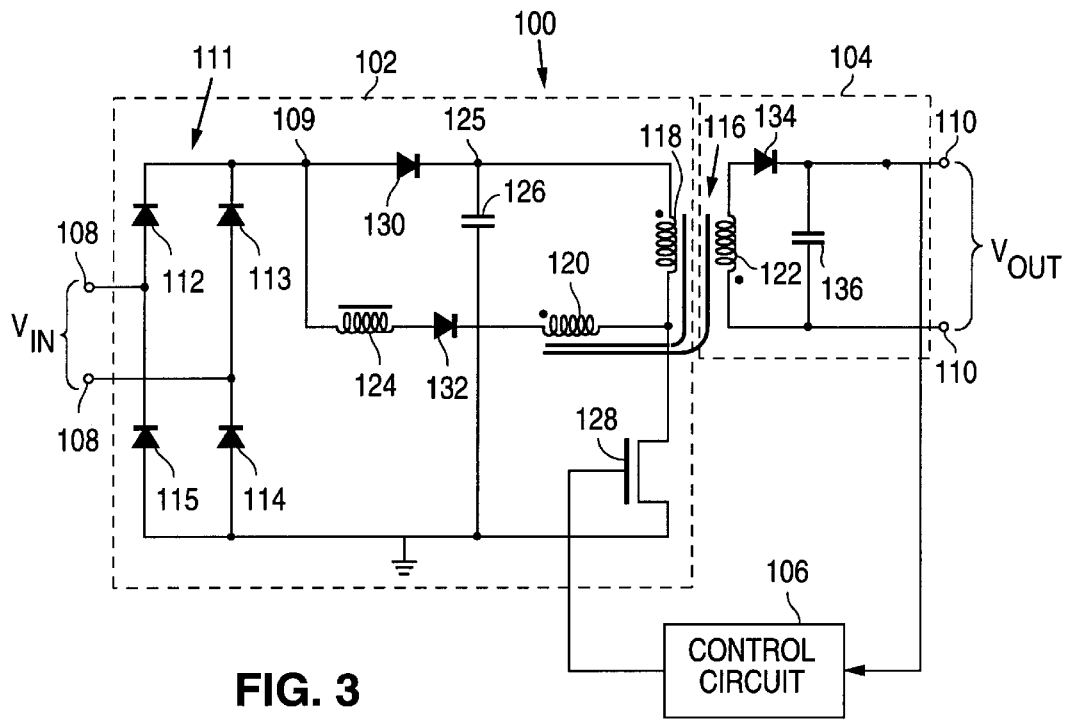
FIG. 3
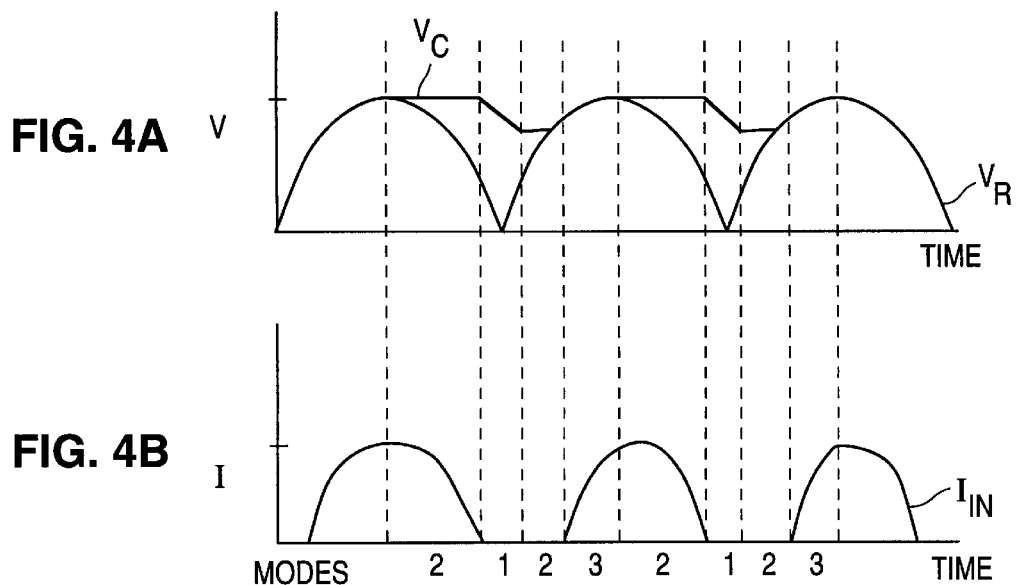
FIG. 4A
FIG. 4B

“HIGH POWER FACTORS, SINGLE STAGE HARMONICS CORRECTION CONVERTER”

HIGH POWER FACTORS, SINGLE STAGE HARMONICS CORRECTION CONVERTER

FIELD OF THE INVENTION

The present invention relates to AC-to-DC power converters (also known as power supplies), and more specifically to an AC-to-DC power converter with a high power factor.

BACKGROUND

"Power factor correction" (PFC) techniques are often used in power converters to reduce the harmonic content of an input current by reforming the input current into approximately a sinewave. See U.S. Pat. No. 5,600,546 "INPUT HARMONIC CURRENT CORRECTED AC-TO-DC CONVERTER WITH MULTIPLE COUPLED PRIMARY WINDINGS", issued Feb. 4, 1997, Francis M. S. Ho, et al.; U.S. Pat. No. 5,446,366 "BOOST CONVERTER POWER SUPPLY WITH REDUCED LOSSES, CONTROL CIRCUIT AND METHOD THEREFOR", issued Aug. 29, 1995, John A. Bassett, et al.; and U.S. patent application "LOW COST AC-TO-DC CONVERTER HAVING INPUT CURRENT WITH REDUCED HARMONICS", Ser. No. 08/721,497, filed Sept. 27, 1996, Franki Ngai Kit Poon, et al.; the subject matter of each of these patent documents is incorporated herein by reference.

FIG. 1 is a simplified circuit diagram of an AC-to-DC power converter 2 designed to reduce the magnitude of input current harmonics with respect to the fundamental input current. AC-to-DC power converter 2 includes input terminals 4 for connection to an AC mains source of power; a rectifier bridge 6; a transformer 8 with a first primary winding 10, a second primary winding 12, and a secondary winding 14; a separate inductor 16; a storage capacitor 18; power diodes 20 and 22; a power switch 24; an output rectifier circuit 26; a control circuit 28; and output terminals 30 for outputting a DC current. In addition, an electromagnetic interference (EMI) filter 32 with a filter inductor 34 and a filter capacitor 36 is illustrated as coupled to power converter 2.

AC-to-DC converter 2 is inefficient due a large amount of input charging current flowing through separate inductor 16. FIG. 2 is a graph depicting the amount of current $I_{16}$ flowing through separate inductor 16 relative to a rectified input voltage $V_R$ at node 7 where the horizontal axis represents time. The large amount of input charging current requires that inductor 16 have low resistance for efficiency reasons. The amount of input charging current flowing through inductor 16 also causes a problem with inductor 16 saturating because of the finite amount of magnetic flux that an inductor can carry in its core.

SUMMARY

An AC-to-DC converter in accordance with the present invention draws input current into the transformer through a separate inductor, while current flowing to and charging the storage capacitor is unimpeded by a separate inductor. When the input voltage is sufficiently high, and the power switch is on, a current flowing from a full-bridge rectifier charges the storage capacitor without first passing through the converter's separate inductor. A part of the current simultaneously energizes the transformer after passing through the converter's separate inductor. When the switch is turned off, current continues to charge the storage capacitor, while a part of that current simultaneously energizes both the first and second primary windings of the transformer. The energy stored in the storage capacitor is transferred to the load when it is not possible to obtain sufficient energy from the input current to supply the load. In this manner the input charging current flowing through the separate inductor is minimized.

In accordance with other embodiments of the present invention, the second primary winding may be eliminated. Further, high recovery speed diodes may be eliminated and replaced by (less expensive) slow recovery speed diodes to reduce costs without sacrificing efficiency.

BRIEF DESCRIPTION OF THE DRAWINGS

FIG. 3 is a simplified circuit diagram of an AC-to-DC power converter in accordance with an embodiment of the present invention.

FIG. 4 is a waveform diagram illustrating operation of the AC-to-DC power converter of FIG. 3.

DETAILED DESCRIPTION OF THE PREFERRED EMBODIMENTS

Figure 1:
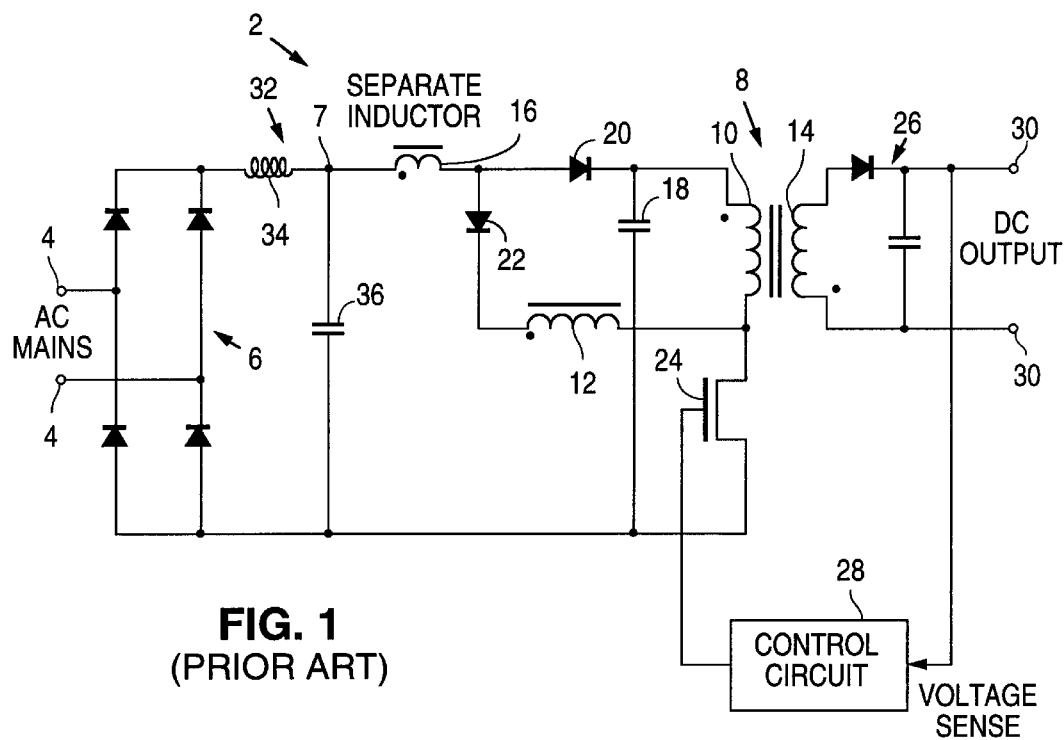
FIG. 1 is a simplified circuit diagram of an AC-to-DC power converter having low input current harmonics.

FIG. 3 is a simplified diagram of an AC-to-DC converter 100 with a primary circuit 102, a secondary circuit 104 and a control circuit 106. AC power received on AC input terminals 108 in primary circuit 102 is converted into DC power output on output terminals 110 in secondary circuit 104. Power converter 100 includes a transformer 116 with a first primary winding 118, a second primary winding 120, and a secondary winding 122. Primary circuit 102 includes a full-bridge rectifier 111, with diodes 112–115 that conventionally rectify the AC voltage $V_{IN}$ received on input terminals 108. Primary circuit 102 also includes a separate inductive element such as an inductor 124, a capacitive element such as a storage capacitor 126, and a power switch 128. Separate inductor 124 is not magnetically coupled with transformer 116. Diodes 130 and 132 limit the direction in which storage capacitor 126 and transformer 116 may discharge. Secondary circuit 104 includes an output rectifying circuit with diode 134 and capacitor 136. Control circuit 106 conventionally controls power switch 128 to turn on and off at a rapid rate, with the on/off duty cycle being controlled to maintain and regulate the desired output voltage $V_{OUT}$ on output terminals 110. The control circuit 106 may pulse-width modulate the on/off times of power switch 128 to achieve the desired regulation. Other techniques for controlling power switch 128 may also be used.

FIG. 4 is a waveform diagram illustrating the operation of power converter 100. Operation of power converter 100 is illustrated in FIG. 4 as having three separate modes labeled on the horizontal axis of FIG. 4. The rectified input voltage waveform $V_R$ in FIG. 4 represents the value of voltage at node 109, which is the rectified A.C. input voltage $V_{IN}$ on input terminals 108. The voltage waveform labeled $V_C$ in FIG. 4 represents the voltage on storage capacitor 126 at node 125 of FIG. 3. The waveform labeled $I_{IN}$ in FIG. 4 represents the rectified value of the input current flowing into AC-to-DC power converter 100 of FIG. 3 via input terminals 108.

As described above, there are three modes of operation for power converter 100. Power switch 128 turns on and off at a rapid rate during each mode. In mode one, no energy flows into power converter 100. Energy is transferred from storage capacitor 126 through transformer 116 and into a load (not shown) connected to output terminals 110. Because energy is being drained from storage capacitor 126 without storage capacitor 126 being recharged, the voltage $V_C$ on storage capacitor 126 decreases throughout mode one. In mode two, there is a small voltage being supplied to transformer 116 from input terminals 108 and separate inductor 124. Thus, when power switch 128 is on, energy is supplied to output terminals 110 from input terminals 108 and storage capacitor 126. When power switch 128 is off in mode two, however, the energy stored in transformer 116 is being released to output terminals 110. At the same time energy from input terminals 108 and separate inductor 124 is being delivered to both output terminals 110 and storage capacitor 126. Storage capacitor 126 in mode two is thus both drained and recharged. Whether charging or discharging is dominating depends on the phase of the line voltage (as $V_R$ increases more energy is being delivered to storage capacitor 126) and on the selection of the parameters of the circuit (inductance of separate inductor 124, magnetizing inductance of the power transformer 116 and ratio between windings 118, 120, and 122). The waveform diagram in FIG. 4, thus shows a constant $V_C$ during mode two, however, one skilled in the art would understand that $V_C$ may increase or decrease during mode two depending on the specific components used in the circuit and the phase of the line voltage. In mode three, the magnitude of rectified input voltage $V_R$ at node 109 is greater than the voltage $V_C$ across storage capacitor 126. Thus, when power switch 128 is on, storage capacitor 126 is recharged with part of the energy from input voltage terminals 108, the other part of the energy from input terminals 108 is transmitted through separate inductor 124 to transformer 116. When power switch 128 is off in mode three, storage capacitor 126 is charged with part of the energy from input terminals 108 and part of the energy transmitted through separate inductor 124 and transformer 116. As illustrated in FIG. 4, the voltage across storage capacitor 126 increases during mode three.

Figure 5:
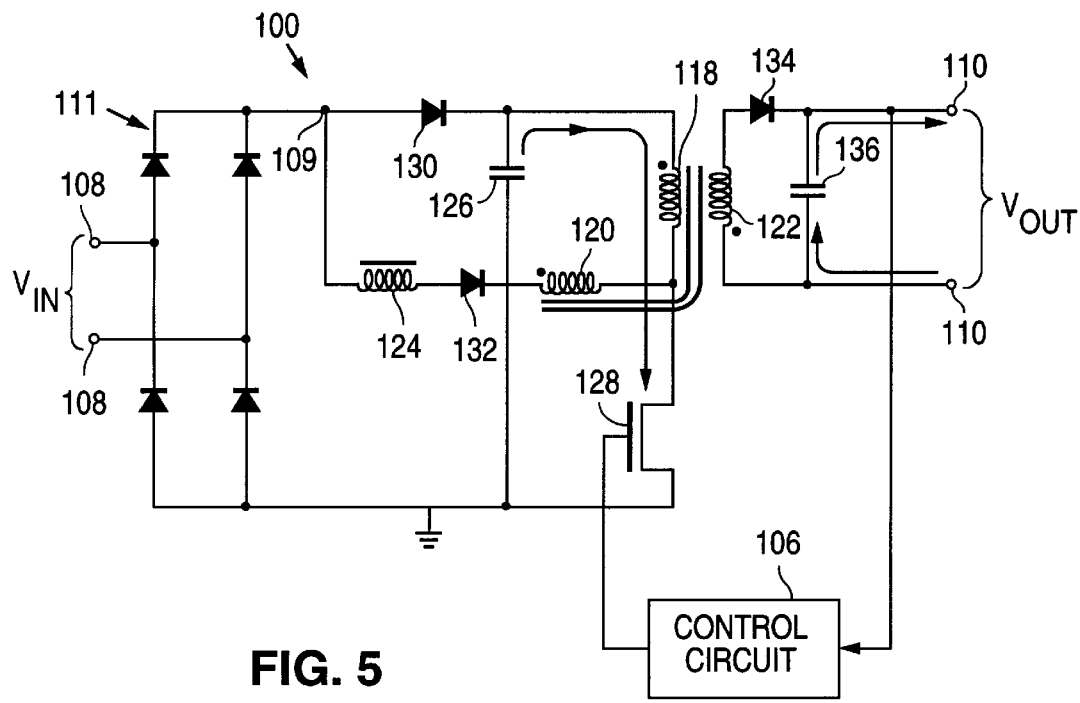
FIGS. 5–10 are simplified circuit diagrams which illustrate current flow in the AC-to-DC power converter of FIG. 3.
Figure 6:
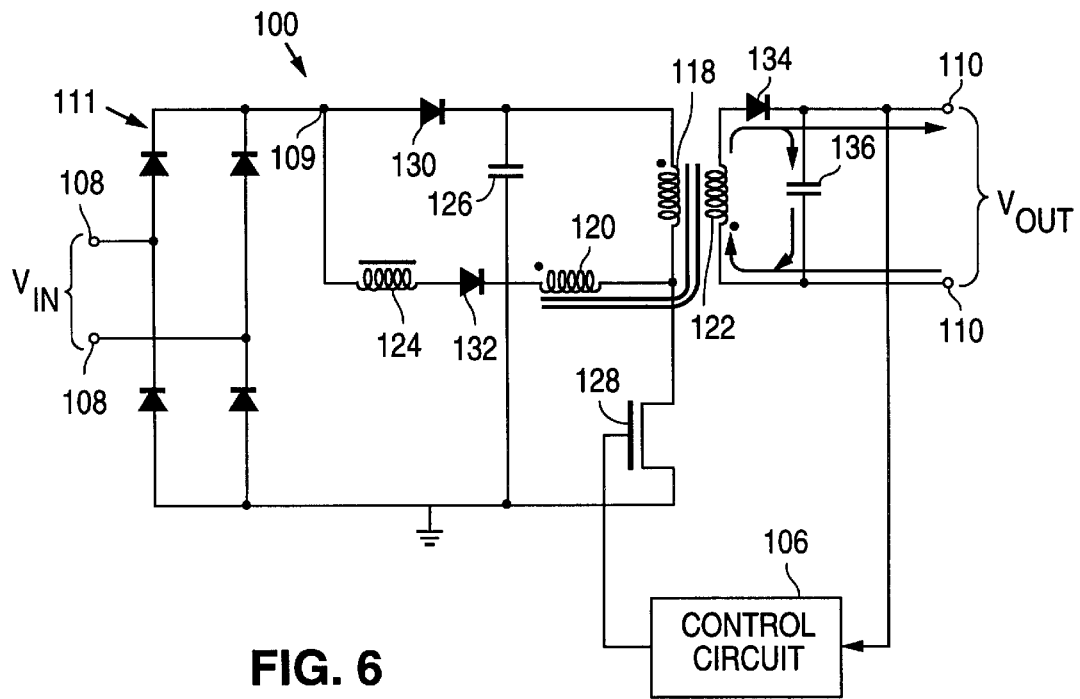

FIG. 5 depicts current flow (arrows) through power converter 100 when power switch 128 is on during mode one. FIG. 6 depicts current flow (arrows) through power converter 100 during mode one when power switch 128 is off. Full-bridge rectifier 111 rectifies the input voltage sinewave $V_{IN}$ from input terminals 108. The rectified input voltage $V_R$ is low during mode one. During mode one, first primary winding 118 is energized by storage capacitor 126 as shown in FIG. 5. The voltage $V_C$ across storage capacitor 126 is greater than $V_R$ at node 109, reverse biasing diode 130, which prevents current flow from node 109 into storage capacitor 126. Diode 130 also prevents current flow from storage capacitor 126 into separate inductor 124. Diode 132 is also reverse biased because $V_R$ is lower than the voltage reflected through windings 118 and 120 from storage capacitor 126. Accordingly, there is no energy flowing into power converter 100 via input terminals 108. As shown in FIG. 5, current flows from storage capacitor 126 through first primary winding 118 through power switch 128 to ground. The source terminal of power switch 128 need not actually be grounded, but for the sake of simplicity of this description, ground will be used as a reference. Thus, energy previously stored in storage capacitor 126 is drained during mode one when power switch 128 is on. The output voltage $V_{OUT}$ is supplied by capacitor 136 of secondary circuit 104 during mode one when switch 128 is on.

FIG. 6 illustrates the current flow (arrows) through power converter 100 in mode one when power switch 128 is off. As discussed above, during mode one both diodes 130 and 132 are reversed biased, preventing current flow. Accordingly, when power switch 128 is off in mode one there is no current flowing through first primary winding 118 or second primary winding 120. Current flow is induced in secondary winding 122, which charges capacitor 136 through forward biased diode 134. The voltage $V_C$ across storage capacitor 126 decreases in mode one in an approximately linear slope shown in FIG. 4 because storage capacitor 126 discharges energy to first primary winding 118 when switch 128 is on (shown in FIG. 5), but does not recharge during mode one when switch 128 is off (shown in FIG. 6). The control circuit 106 modifies the duty cycle of on and off times of power switch 128 in mode one to account for the decrease of voltage on storage capacitor 126 and to maintain a constant flow of energy to first primary winding 118.

The rectified input voltage $V_R$ decreases during mode one until it reaches zero, then $V_R$ begins to increase, as shown in FIG. 4. In mode one, diode 132 is reverse biased. Thus, no current flows through separate inductor 124. The rectified input voltage $V_R$ continues to increase until $V_R$ at node 109 equals the voltage reflected during on-time through windings 120 and 118 from storage capacitor 126:

$$V_R > V_C * (N_{120}/N_{118}) \quad \text{(equ.1)}$$

where $V_R$ is the rectified input voltage, $V_C$ is the voltage over storage capacitor 126, $N_{118}$ is the number of windings in first primary winding 118, and $N_{120}$ is the number of windings in second primary winding 120. During mode two, rectified input voltage $V_R$ at node 109 is still less than the voltage $V_C$ over storage capacitor 126. Thus, diode 130 remains reverse biased preventing current flow from rectifier bridge 111 into storage capacitor 126.

Figure 7:
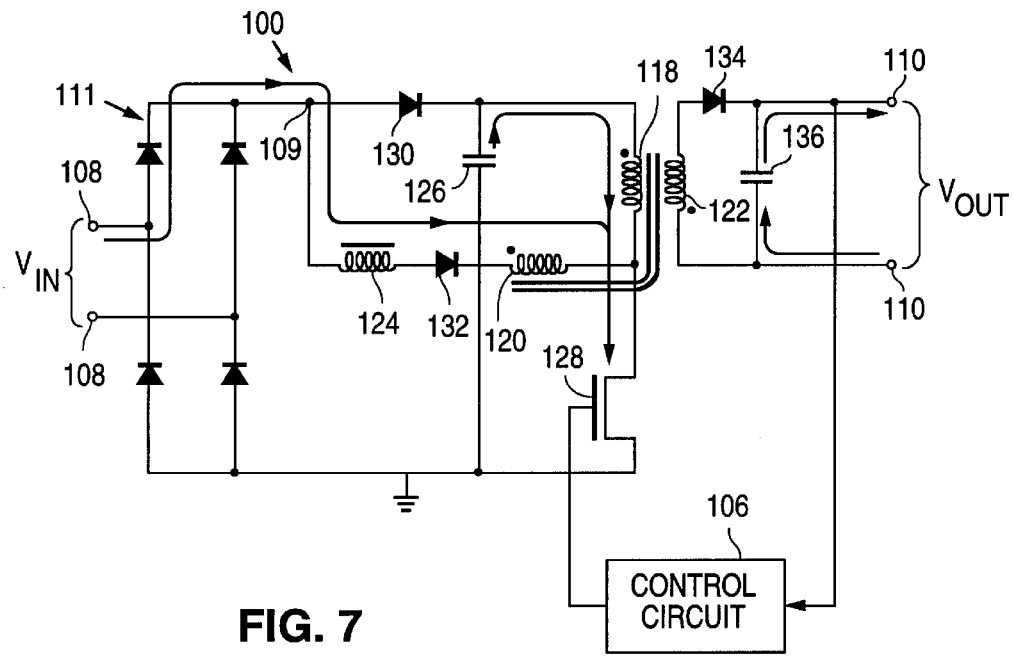

When power switch 128 is on during mode two, as shown in FIG. 7, current flows from input terminals 108, through full-bridge rectifier 111, through separate inductor 124, through forward biased diode 132, through first primary winding 118, and through power switch 128 to ground. Of course, the location of diode 132 can be changed from one side of separate inductor 124 as illustrated in FIG. 7 to the other side of separate inductor 124 without changing the operation of power circuit 100. During mode 2 with power switch 128 on, current also flows (arrows) from storage capacitor 126, through first primary windings 118, and through power switch 128 to ground as illustrated in FIG. 7. The output voltage $V_{OUT}$ is supplied by capacitor 136 of secondary circuit 104 during mode two when power switch 128 is on.

Figure 8:
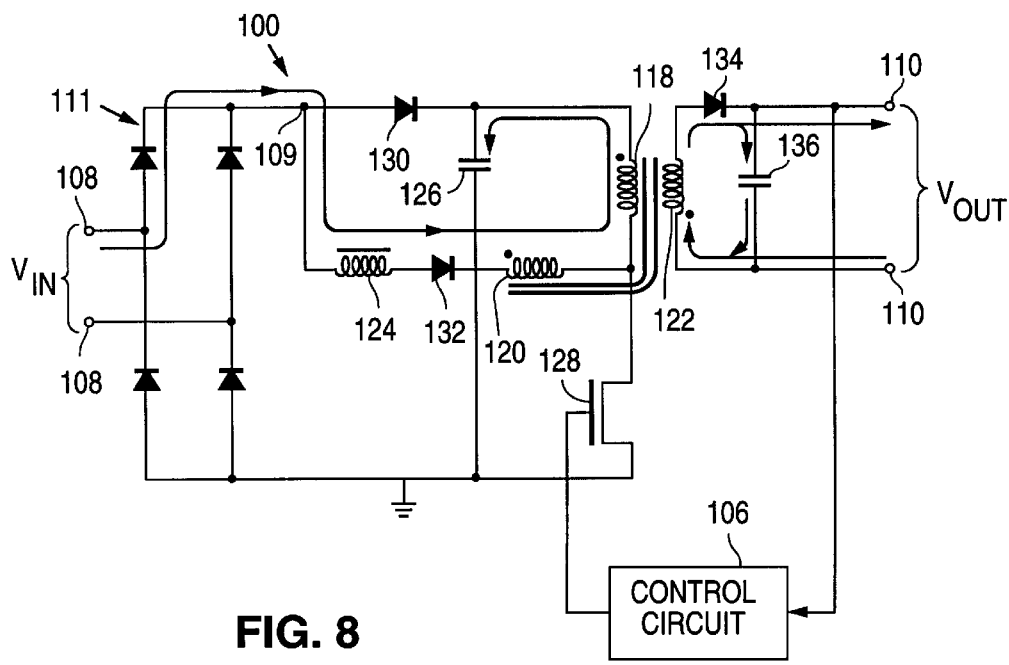

FIG. 8 illustrates current flow (arrows) in power converter 100 during mode two when power switch 128 is off. Separate inductor 124 releases energy by inducing a voltage such that the voltage induced across separate inductor 124 plus the rectified input voltage $V_R$ is greater than the difference between the voltages of both primary windings 118, 120 plus the voltage on storage capacitor 126, i.e., $$V_R + V_{124} > V_C + V_{OUT}(N_{118} - N_{120})/N_{122} \quad \text{(equ. 2)}$$

where $V_R$ is the rectified input voltage at node 109, $V_{124}$ is the voltage induced across separate inductor 124, $V_{OUT}$ is the output voltage at terminals 110, $N_{118}$ is the number of windings of first primary winding 118, $N_{120}$ is the number of windings of second primary winding 120, and $N_{122}$ is the number of windings of secondary winding 122. Current flow through separate inductor 124 and second primary winding 120 is redirected due to power switch 128 being off such that current flows in reverse direction through first primary winding 118 and into storage capacitor 126, thereby replacing some of the energy that drained out of storage capacitor 126 when power switch 128 was on. Whether storage capacitor 126 has a net increase or decrease in charge depends on several factors such as the phase of the line voltage (as $V_R$ increases more energy is being delivered to storage capacitor 126) and on the selection of the parameters of the circuit (inductance of separate inductor 124, magnetizing inductance of transformer 116, and the ratio between windings 118, 120, and 122). The change of current flow in first primary winding 118 induces current to flow in secondary winding 122, which supplies the load with needed energy and recharges capacitor 136 through forward biased diode 134.

When the rectified input voltage $V_R$ exceeds the voltage $V_C$ on storage capacitor 126, diode 130 becomes forward biased. This is the transition from mode two to mode three.

Figure 9:
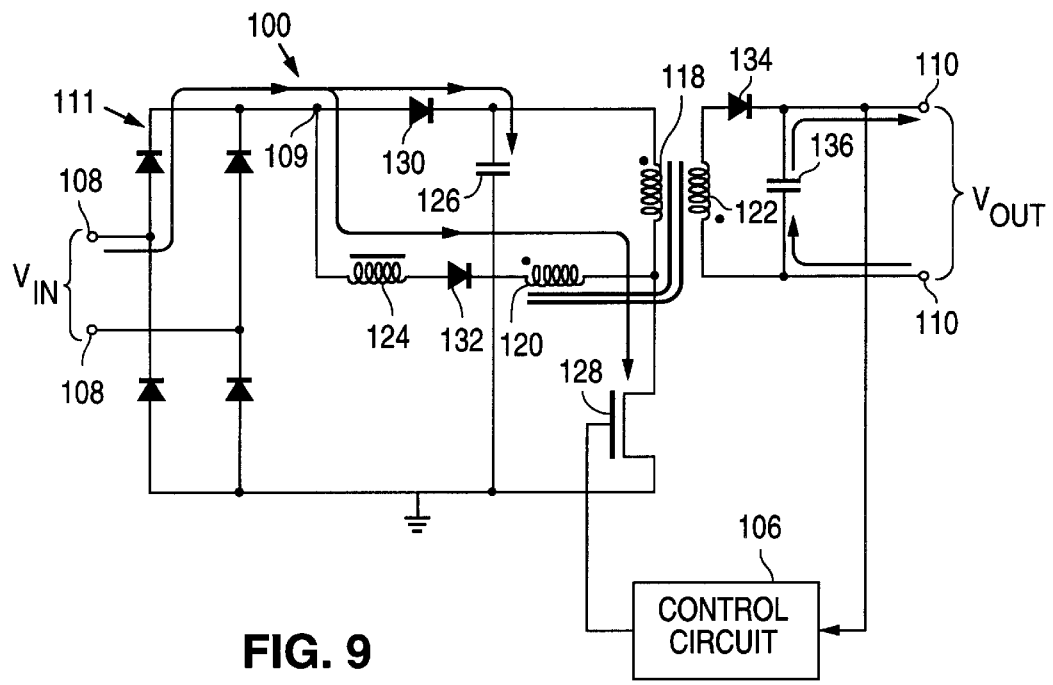

FIG. 9 illustrates circuit operation in power converter 100 during mode three when power switch 128 is on. In mode three, a current flows from input terminals 108 and through full-bridge rectifier 111. A part of this current flows through forward biased diode 130 and into storage capacitor 126, without first passing through separate inductor 124. With power switch 128 on, part of the current passing through full-bridge rectifier 111 flows through separate inductor 124, through forward biased diode 132, through second primary winding 120 and through power switch 128 to ground. Thus, while storage capacitor 126 is recharging with a part of the current from full-bridge rectifier 111, second primary winding 120 is energized with the other part of the current, which first passed through separate inductor 124.

Figure 10:
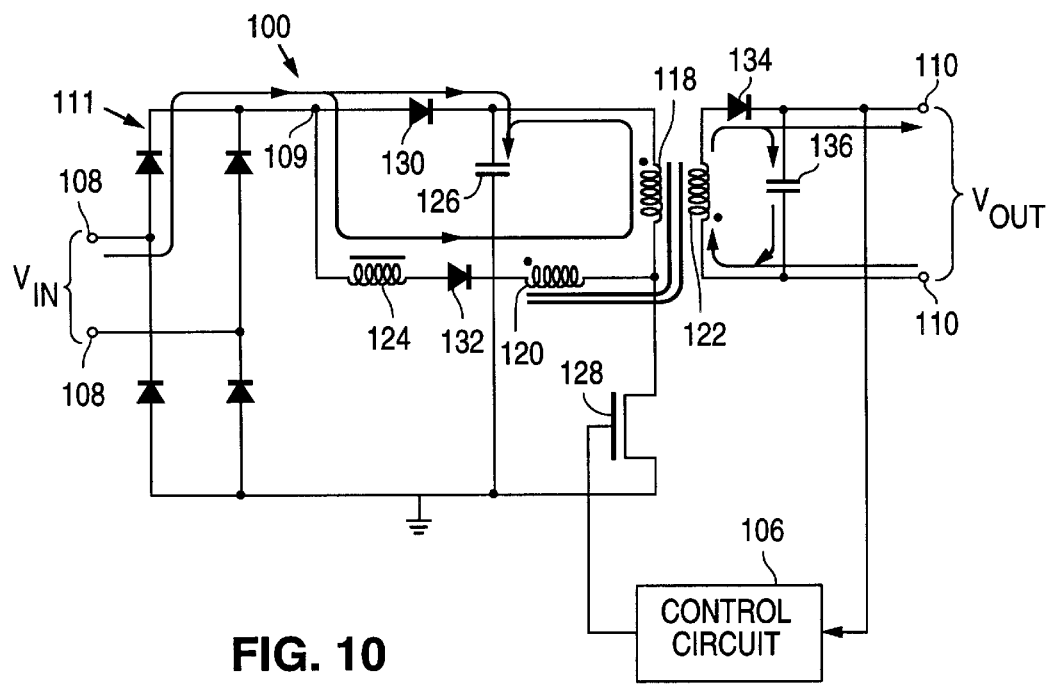

FIG. 10 illustrates operation of power converter 100 when power switch 128 is off during mode three. With power switch 128 off, the current flowing (arrows) through separate inductor 124 and second primary winding 120 is redirected such that current flows in the reverse direction through first primary winding 118 and into storage capacitor 126, thereby replacing some of the energy that was drained out of storage capacitor 126. Energy is transferred from first primary winding 118 to secondary winding 122 such that a current flows through secondary winding 122. This current flow through secondary winding 122 supplies the load with energy and recharges capacitor 136. As illustrated in FIG. 4, voltage $V_C$ on storage capacitor 126 increases during mode three.

The rectified input voltage $V_R$ will reach a maximum and then it will begin to decrease as shown in FIG. 4. As $V_R$ decreases it will become less than the voltage $V_C$ on storage capacitor 126. At that point, diode 130 become reversed biased, preventing current from rectified bridge 111 from flowing into storage capacitor 126. Mode three transitions back into mode two at this time as shown in FIG. 4. The rectified input voltage $V_R$ will continue to decrease until diode 132 become reverse biased, at which point the power converter 100 transitions from mode two into mode one.

Figure 11:
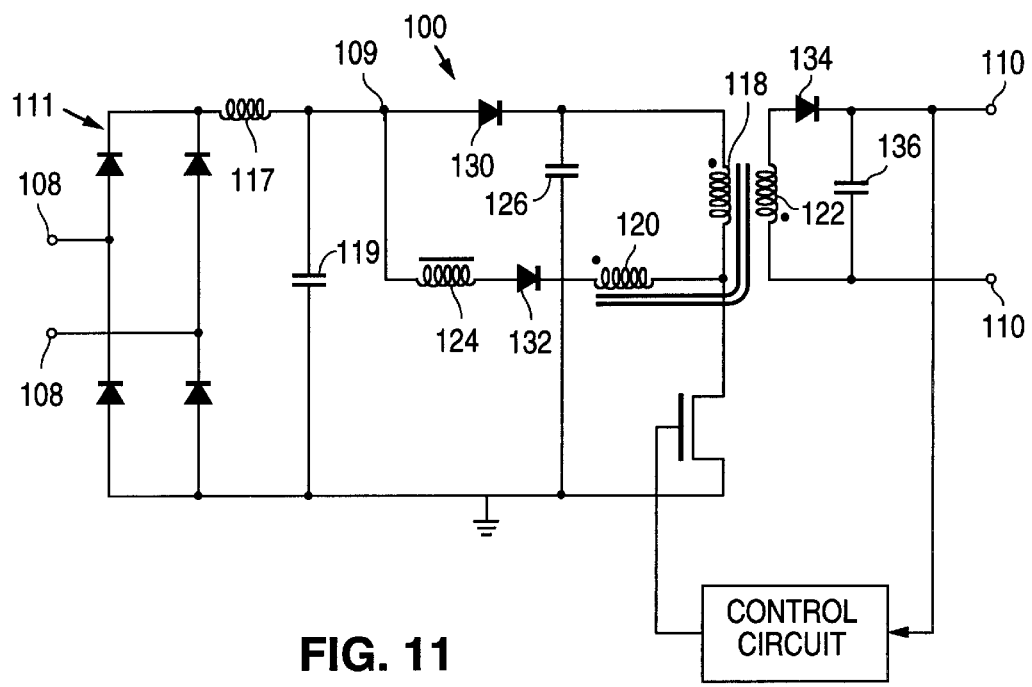
FIG. 11 is a detailed circuit diagram of an AC-to-DC power converter including an EMI filter and in accordance with an embodiment of the present invention.

FIG. 11 is a detailed circuit diagram of a specific embodiment of an AC-to-DC converter in accordance with the present invention in which an additional filter inductor 117 and filter capacitor 119 are provided for filtering electromagnetic interference (EMI). Filter inductor 117 and filter capacitor 119, however, are not necessary for the performance of power converter 100.

Table 1 below sets forth component values in accordance with one specific embodiment wherein $V_{IN}$ is 90 volts A.C. R.M.S. at 50 Hz, output is 75 watts, and wherein control circuit 106 is a commercially available Unitrode UC3843 integrated circuit (pin 2 is the input and pin 6 is the output).

TABLE 1

| COMPONENT | VALUE/TYPE |
|---|---|
| Filter Inductor 117 | 1 mH |
| Separate Inductor 124 | 180 µH |
| Filter Capacitor 119 | 0.47 µF |
| Storage Capacitor 126 | 220 µF |

Figure 12:
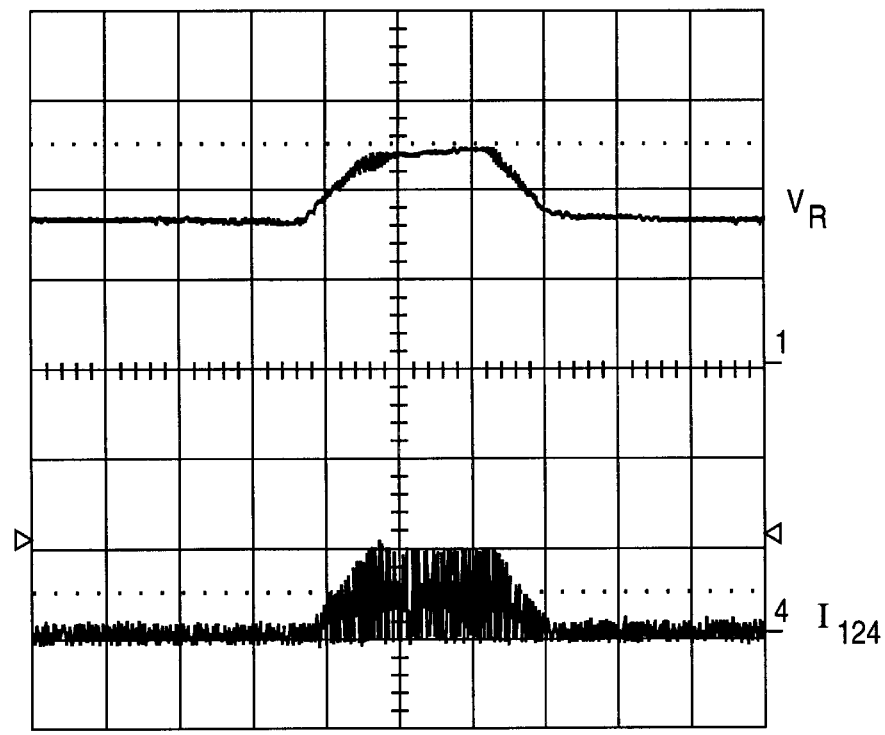
FIG. 12 is a chart illustrating the magnitude of the current in separate inductor 124 (FIG. 11) relative to the rectified input voltage at node 109 (FIG. 11).

When rectified input voltages are sufficiently high, i.e., mode three shown in FIGS. 9 and 10, part of the current that transfers energy to storage capacitor 126 does so without first flowing through separate inductor 124. Thus, the input charging current flowing through separate inductor 124 is limited. FIG. 12 shows a graph depicting the amount of current $I_{124}$ flowing through separate inductor 124 relative to a rectified input voltage $V_R$ at node 109 of power converter 100 as illustrated in FIG. 11 and with the component values described in Table 1 where the horizontal axis represents time. A comparison between FIG. 12 and FIG. 2, which is under the same input and output conditions and contains corresponding components, clearly shows there is less current flowing through separate inductor 124 of power converter 100 as shown in FIG. 11 than in separate inductor 16 in power converter 2 illustrated in FIG. 1. Thus, separate inductor 124 of power converter 100 may be smaller than inductor 16 in circuit 1. Further, power converter 100 has less associated losses due to the placement of separate inductor 124.

Figure 2:
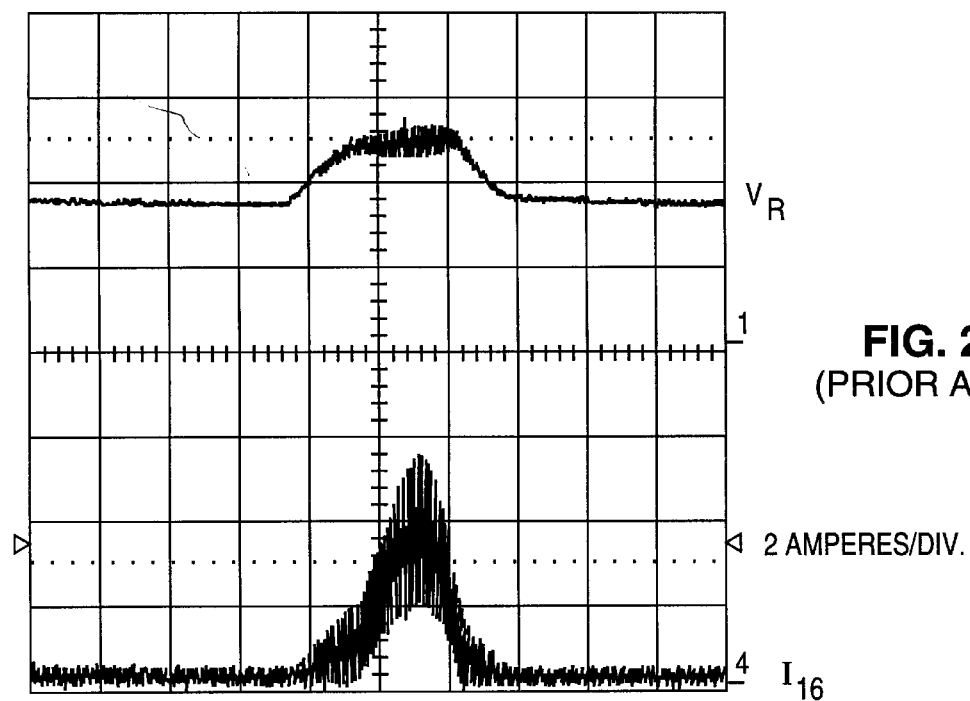
FIG. 2 is a chart illustrating with reference to FIG. 1 the magnitude of the current in separate inductor 16 relative to the filtered rectified input voltage at node 7.

The performance characteristics of an AC-to-DC converter in accordance with the present invention as well as the converter shown in FIG. 1 are set forth below in Tables 2 and 3. Table 2 compares the magnitudes of the odd input current harmonics of power converter 100 as illustrated in FIG. 11, with power converter 2 shown in FIG. 1, and the International Electrotechnical Commission (I.E.C.) 1000-3-2 standard for an approximate 107 watt input power supply.

TABLE 2

| HARMONICS OF FUNDAMENTAL INPUT CURRENT | POWER CONVERTER CIRCUIT 100 (FIG. 11) (in amperes) | POWER CONVERTER CIRCUIT 2 (FIG. 1) (in amperes) | I.E.C. STANDARD (in amperes) |
|---|---|---|---|
| 3rd | 0.29 | 0.33 | 0.365 |
| 5th | 0.13 | 0.14 | 0.20 |
| 7th | 0.06 | 0.06 | 0.10 |
| 9th | 0.03 | 0.03 | 0.05 |

Table 3 compares the thermal performance of power converter 100 as illustrated in FIG. 11 with the components described in Table 1, with power converter 2 shown in FIG. 1, and a device operating without a power factor correction circuit. As shown in Table 3, power converter 100 exhibits less component heating, i.e. wastes less power.

TABLE 3

| COMPONENT | POWER CONVERTER CIRCUIT 100 (FIG. 11) (degrees C.) | POWER CONVERTER CIRCUIT 2 (FIG. 1) (degrees C.) | WITHOUT PFC CIRCUIT (degrees C.) |
|---|---|---|---|
| Power Switch | 61 | 64 | 60 |
| Transformer | 56 | 56 | 56 |
| Diode 132/ Diode 22 | 56 | 56 | / |
| Diode 130/ Diode 20 | 38 | 53 | / |
| Separate Inductor | 41 | 42 | / |
| Filter Inductor | 33 | 38 | / |

FIGS. 13A–13E are simplified diagrams of various other embodiments. Each of the diagrams include the AC input terminals 108 and the DC output terminals 110, the full-bridge rectifier 111 including diodes 112–115, the separate inductor 124, the storage capacitor 126, the transformer 116 with at least a primary winding 118 and a secondary winding 122, the control circuit 106, and the output capacitor 136. There is also a diode 134, connected between secondary winding 122 and output capacitor 136.

Figure 13A:
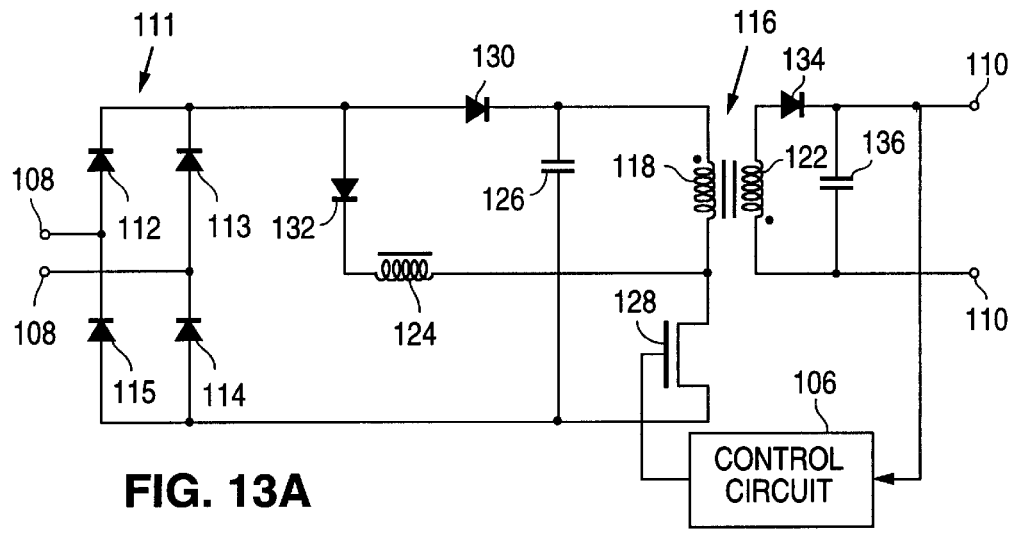
FIGS. 13A through 13E are simplified circuit diagrams of various other embodiments.
Figure 13B:
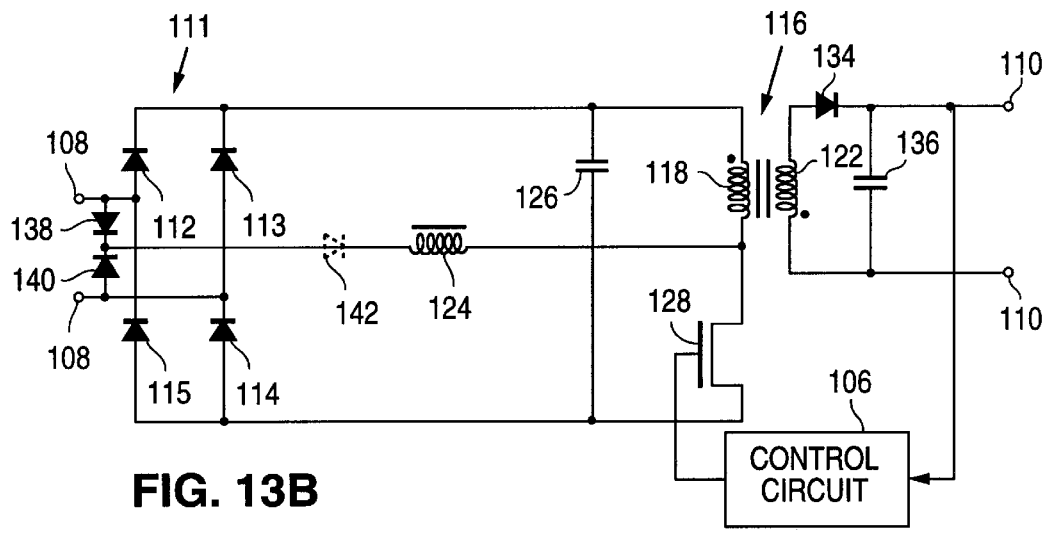
Figure 13C:
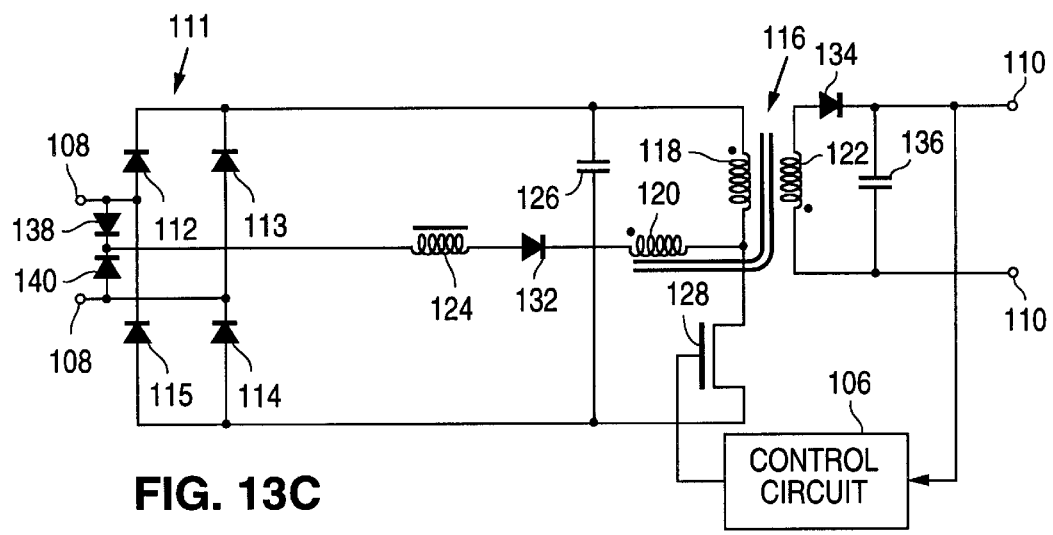

In the embodiment of FIG. 13A, transformer 116 has only one primary winding 118. The value of separate inductor 124 is chosen to be high, e.g., 300 μH, such that energy from separate inductor 124 is never sufficient to cause the voltage $V_C$ on storage capacitor 126 to rise above the peak rectified input voltage $V_R$. FIG. 13B is a diagram of a circuit similar to that of FIG. 13A; however, the energy transmitted to separate inductor 124 does not travel through full-bridge rectifier 111, but instead travels from AC input terminals 108, through diode 138 or diode 140, whichever is forward biased, and directly to separate inductor 124. Storage capacitor 126 cannot discharge towards AC input terminals 108 because of diodes 112 and 113 in the full-bridge rectifier 111. Similarly, separate inductor 124 is blocked from discharging toward AC input terminals because of diodes 138 and 140. Diodes 130 and 132 are unnecessary in this embodiment. Accordingly, this embodiment has increased efficiency because it has only a one diode voltage drop in the current path to either storage capacitor 126 or separate inductor 124. A fast recovery diode 142 (phantom lines in FIG. 13B) may be added to the path between diodes 138, 140 and separate inductor 124. With diode 142 located before separate inductor 124, diodes 138 and 140 can be inexpensive slow recovery type diodes. FIG. 13C is a diagram of a circuit that is similar to the circuit of FIG. 13B, with the addition of a second primary winding 120 in transformer 116 and diode 132. Second primary winding 120 decreases leakage inductance, which accordingly improves the efficiency of the circuit.

Figure 13D:
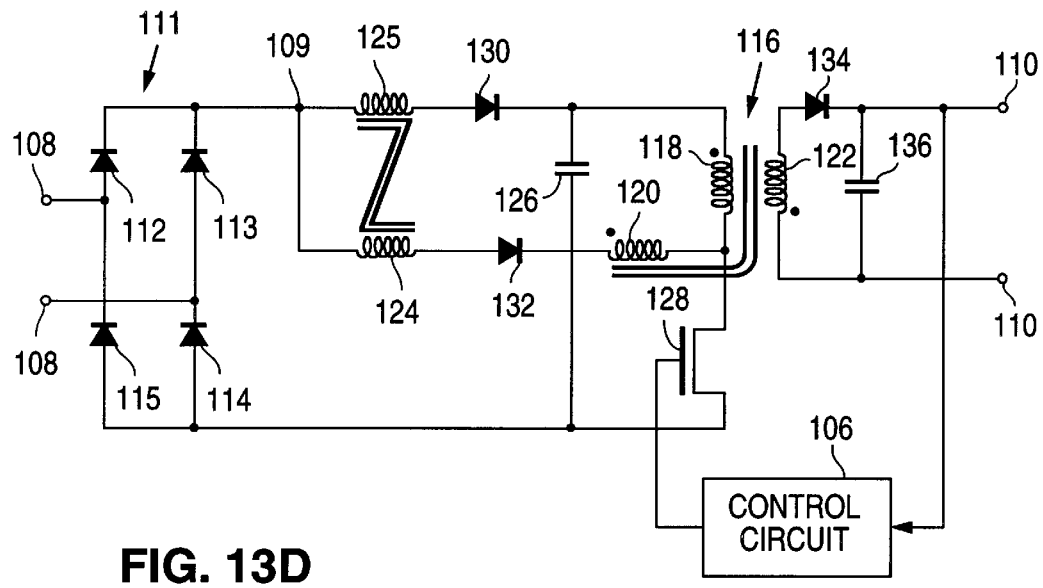
Figure 13E:
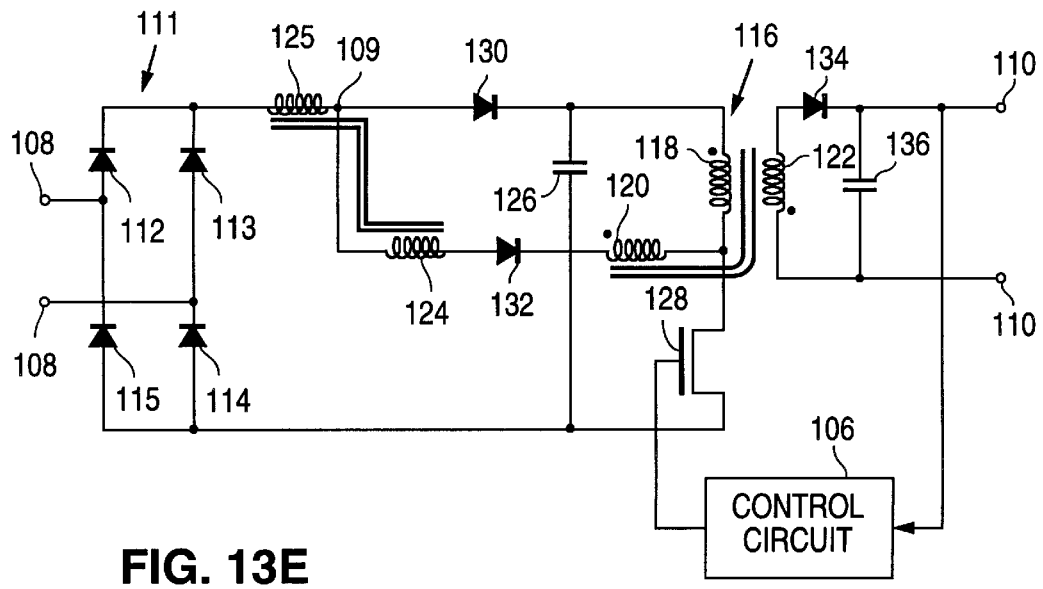

FIGS. 13D and 13E are diagrams of a circuit in which there is a first primary winding 118 and a second primary winding 120 in transformer 116 and separate inductor 124 has a second set of windings 125 connected between full-bridge rectifier 111 and storage capacitor 130. In FIG. 13D, second set of windings 125 is located between node 109 and diode 130. In FIG. 13E, separate inductor 124 is tapped such that second set of windings 125 is coupled between full-bridge rectifier 111 and node 109. The number of windings in inductor 124 should be greater than the number of windings in second set of windings 125. Without windings 125, when the rectified input voltage $V_R$ is high there is very little resistance to create current flow into storage capacitor 126, which causes a current spike. The embodiments of FIGS. 13D and 13E have inductor 125 in the current path to storage capacitor 126 so that there is less of a current spike. The number of windings 125 are kept low, however, so that there is little inductance leakage.

Although specific embodiments have been described and illustrated in order to explain the present invention, the present invention is not limited thereto. Additional circuit components can be added to achieve additional functions including electromagnetic filtering. Additional output secondary windings and associated output rectifier circuits can be added to provide other output voltages on other output terminals. The order of circuit components connected in series can be reversed in some embodiments. Accordingly, various adaptations, modifications and combinations of the features of the specific embodiments can be practiced without departing from the scope of the invention as set forth in the following claims.

What is claimed is:

1. An AC-to-DC power converter, said converter comprising:

two AC input terminals;

an inductive element having a first set of windings with a first terminal and a second terminal, said first terminal of said first set of windings being coupled to one of said AC input terminals;

a transformer having a first primary winding and a secondary winding, said first primary winding having a first terminal and a second terminal, said first terminal of said first primary winding being coupled to one of said AC input terminals and said second terminal of said first primary winding being coupled to said second terminal of said first set of windings of said inductive element;

at least one DC output terminal coupled to said secondary winding;

a switch having a first terminal, a second terminal, and a control terminal, said first terminal of said switch being coupled to said second terminal of said first primary winding;

a capacitive element having a first terminal and a second terminal, said first terminal of said capacitive element being coupled to one of said AC input terminals and said first terminal of said first primary winding, said second terminal of said capacitive element being coupled to said second terminal of said switch; and a control circuit coupled to said control terminal of said switch, wherein said control circuit controls said switch such that when said switch is on a first current flows from one of said AC input terminals into said first terminal of said capacitive element but not said first set of windings of said inductive element while a second current flows from one of said AC input terminals through said inductive element and through said switch, and such that when said switch is off a third current flows from one of said AC input terminals into said first terminal of said capacitive element but not said first set of windings of said inductive element while a fourth current flows from one of said AC input terminals through said inductive element, through said transformer, and into said first terminal of said capacitive element.

2. The AC-to-DC power converter of claim 1, wherein said transformer has a second primary winding magnetically coupled to said secondary winding, said second primary winding having a first terminal and a second terminal, said first terminal of said second primary winding being coupled to said second terminal of said first set of windings and said second terminal of said second primary winding being coupled to said first terminal of said switch.

3. The AC-to-DC power converter of claim 2, wherein said second current flows from one of said AC input terminals through said first set of windings and through said second primary winding and through said switch, and said fourth current flows from one of said AC input terminals through said first set of windings, through said second primary winding, through said first primary windings and into said first terminal of said capacitive element.

4. The AC-to-DC power converter of claim 1, wherein said inductive element further includes of a second set of windings magnetically coupled to said first set of windings, said second set of windings having a first terminal and a second terminal, said first terminal of said second set of windings being coupled to one of said AC input terminals, said second terminal of said second set of windings being coupled to said first terminal of said capacitive element, wherein said first and third currents flow from one of said AC input terminals through said second windings and into said first terminal of said capacitive element.

5. The AC-to-DC power converter of claim 4, wherein said first terminal of said first set of windings is coupled to said second terminal of said second set of windings.

6. The AC-to-DC power converter of claim 1, further comprising:
  a rectifier having an input port and an output terminal, said input port of said rectifier being coupled to said AC input terminals, and said output terminal of said rectifier being coupled to said first terminal of said first primary windings, said first terminal of said first set of windings, and said first terminal of said capacitive element;
  a first diode having a first terminal and a second terminal, said first terminal of said first diode being coupled to said output terminal of said rectifier, said second terminal being coupled to said first terminal of said capacitive element and said first terminal of said first primary winding; and
  a second diode positioned between said output terminal of said rectifier and said first terminal of said switch.

7. The AC-to-DC power converter of claim 6, wherein said first and third currents flow serially from said AC input terminals, through said rectifier, through said first diode into said first terminal of said capacitive element, said second current flows serially from said AC input terminals, through said rectifier, through said inductive element, through said second diode and through said switch, and said fourth current flows serially from said AC input terminals, through said rectifier, through said inductive element, through said second diode, through said first primary winding, and into said first terminal of said capacitive element.

8. The AC-to-DC power converter of claim 6, wherein said first and third currents flow serially from said AC input terminals, through said rectifier, through said first diode into said first terminal of said capacitive element, said second current flows serially from said AC input terminals, through said rectifier, through said second diode, through said inductive element, and through said switch, and said fourth current flows serially from said AC input terminals, through said rectifier, through said second diode, through said inductive element, through said first primary winding, and into said first terminal of said capacitive element.

9. An AC-to-DC converter, comprising:

a rectifier having a first input terminal, a second input terminal, a first output terminal, and a second output terminal;
  a first diode having a first terminal and a second terminal, said first terminal of said first diode being coupled to said first output terminal of said rectifier;
  a first inductive element having a first primary winding and a secondary winding, wherein said first primary winding has a first terminal and a second terminal, said first terminal of said first primary winding being coupled to said second terminal of said first diode;
  at least one DC output terminal coupled to said secondary winding;
  a second inductive element having a first terminal and a second terminal, said first terminal of said second inductive element being coupled to said first output terminal of said rectifier and said first terminal of said first diode;
  a switch having a first terminal, a second terminal and a control terminal, said first terminal of said switch being coupled to said second terminal of said first primary winding and said second terminal of said second inductive element;
  a capacitive element having a first terminal and a second terminal, said first terminal of said capacitive element being coupled to said second terminal of said first diode and being coupled to said first terminal of said first primary winding, said second terminal of said capacitive element being coupled to said second terminal of said switch and being coupled to said second output terminal of said rectifier;
  a control circuit having an input terminal and an output terminal, said input terminal of said control circuit being coupled to said at least one DC output terminal, said output terminal of said control circuit being coupled to said control terminal of said switch.

10. The AC-to-DC power converter of claim 9, further comprising a second diode positioned between said second terminal of said second inductive element and said second terminal of said first primary winding.

11. The AC-to-DC power converter of claim 9, further comprising a second diode positioned between said first output terminal of said rectifier and said first terminal of said second inductive element.

12. The AC-to-DC power converter of claim 9, wherein said first inductive element has a second primary winding, said second primary winding having a first terminal and a second terminal, said first terminal of said second primary winding being coupled to said second terminal of said second inductive element, said second terminal of said second primary winding being coupled to said first terminal of said switch and being coupled to said second terminal of said first primary winding.

13. The AC-to-DC power converter of claim 9, a filter element coupled between said first output terminal of said rectifier said first terminal of said first diode.

14. An AC to DC power conversion method, comprising the steps of:
  (a) in a first time interval of a period of an AC signal, transferring capacitively stored energy to a first primary winding of a transformer;
  (b) in a second time interval of said period of said AC signal, transferring energy by energizing a second primary winding of said transformer with an inductively charged current, while said first primary winding of said transformer is energized by capacitively stored energy;

(c) in a third time interval of said period of said AC signal, transferring energy by energizing said second primary winding of said transformer with an inductively charged current, while capacitively storing energy from a rectified AC signal; and (d) rectifying voltage induced across a secondary winding of said transformer into a DC voltage.

* * * * *